United States Patent [19]

Beauvais

[11] Patent Number: 5,110,182
[45] Date of Patent: May 5, 1992

[54] PORTABLE SEAT

[75] Inventor: Randall Beauvais, Fenton, Mo.

[73] Assignee: Life Force Associates, L.P., Fenton, Mo.

[21] Appl. No.: 260,598

[22] Filed: Oct. 21, 1988

[51] Int. Cl.⁵ .............................................. B60R 21/00
[52] U.S. Cl. ..................................... 297/216; 297/250; 297/325
[58] Field of Search ............... 297/216, 250, 252, 255, 297/464, 470, 329, 317, 318, 327

[56] References Cited

U.S. PATENT DOCUMENTS

| | | |
|---|---|---|
| 45,050 | 11/1864 | Kimball . |
| 2,227,717 | 1/1941 | Jones . |
| 2,660,222 | 11/1953 | Woodsworth . |
| 2,725,921 | 12/1955 | Markin . |
| 2,735,476 | 2/1956 | Fieber . |
| 2,789,650 | 7/1953 | Krous . |
| 2,818,909 | 1/1958 | Burnett . |
| 2,823,730 | 2/1958 | Lawrence . |
| 2,826,241 | 3/1958 | Himka . |
| 2,883,206 | 4/1959 | Racine . |
| 2,970,862 | 2/1961 | Racine . |
| 2,978,273 | 4/1961 | Racine . |
| 3,359,035 | 12/1967 | Schiffman ........................... 297/317 |
| 3,460,791 | 8/1969 | Judd . |
| 3,463,543 | 8/1969 | Zellar . |
| 3,552,795 | 1/1971 | Perkins et al. . |
| 3,645,548 | 2/1972 | Briner ................................. 297/216 |
| 3,697,128 | 10/1972 | Strien et al. . |
| 3,731,972 | 5/1973 | McConnell . |
| 3,853,298 | 12/1974 | Libkle et al. ........................ 248/429 |
| 3,858,930 | 1/1975 | Calandra . |
| 3,897,036 | 7/1975 | Nystrom ............................. 248/399 |
| 4,042,276 | 8/1977 | Breitschwerdt . |
| 4,301,983 | 11/1981 | Horan ............................. 297/216 X |
| 4,634,169 | 1/1987 | Hasstedt . |

FOREIGN PATENT DOCUMENTS

| | | |
|---|---|---|
| 234522 | 7/1964 | Austria . |
| 537159 | 4/1955 | Belgium . |
| 1430028 | 3/1969 | Fed. Rep. of Germany . |
| 3422695 | 12/1985 | Fed. Rep. of Germany ...... 297/216 |
| 823912 | 7/1937 | France . |
| 1253143 | 12/1960 | France . |
| 2596338 | 10/1987 | France ................................ 297/216 |
| 509033 | 10/1937 | United Kingdom . |
| 1242386 | 8/1971 | United Kingdom . |
| 1478323 | 6/1977 | United Kingdom ................ 297/216 |

Primary Examiner—Jose V. Chen
Attorney, Agent, or Firm—Kenyon & Kenyon

[57] ABSTRACT

A portable seat especially adapted for use as a baby seat has a portable base with means for releasably attaching the base to the seat of a vehicle and a seat supported by the base, connected between the portable base and the seat by which the seat can move relative to the base in a controlled manner to elevate the front and the rear of the seat in the same action as the seat moves forward such as occurs by inertia upon a sudden deceleration, the entire apparatus being self-contained and portable so that the apparatus can be removed or installed as desired.

19 Claims, 8 Drawing Sheets

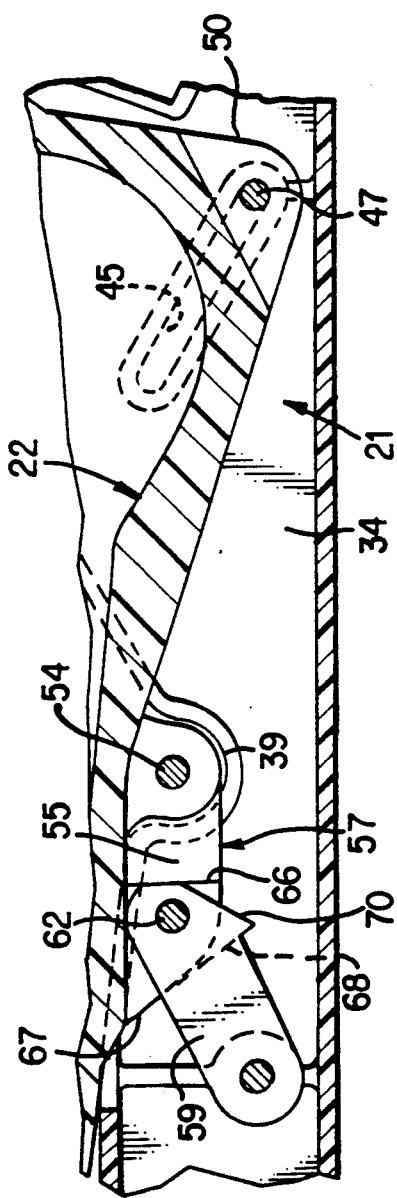
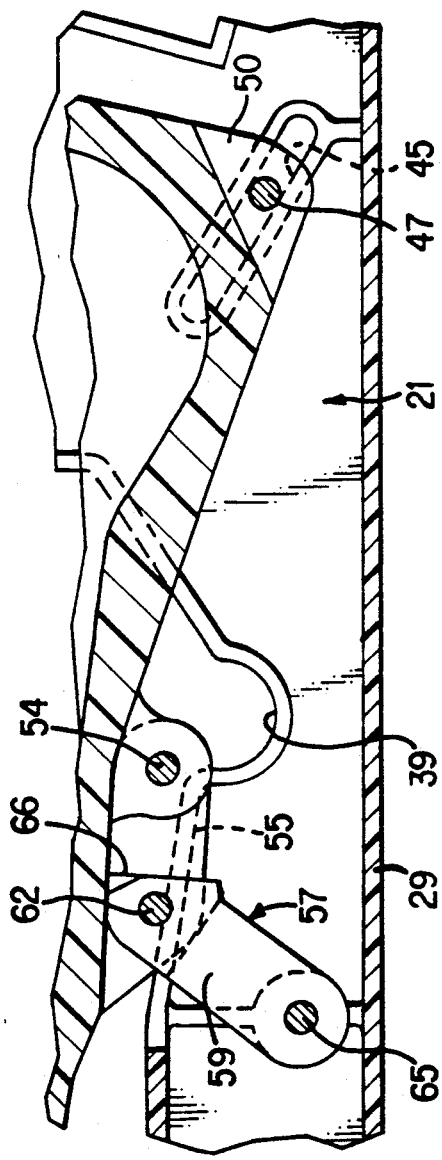

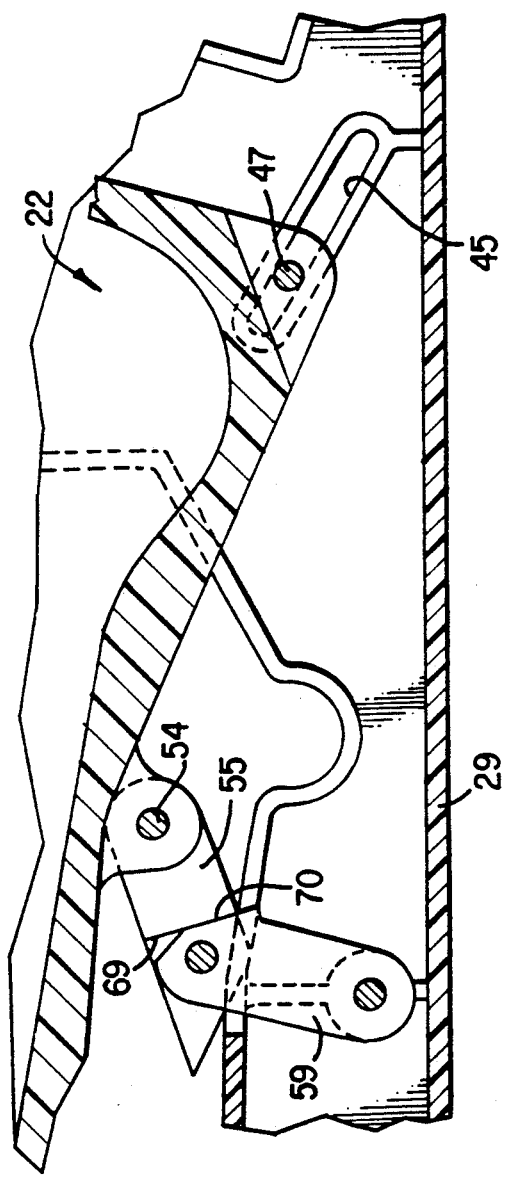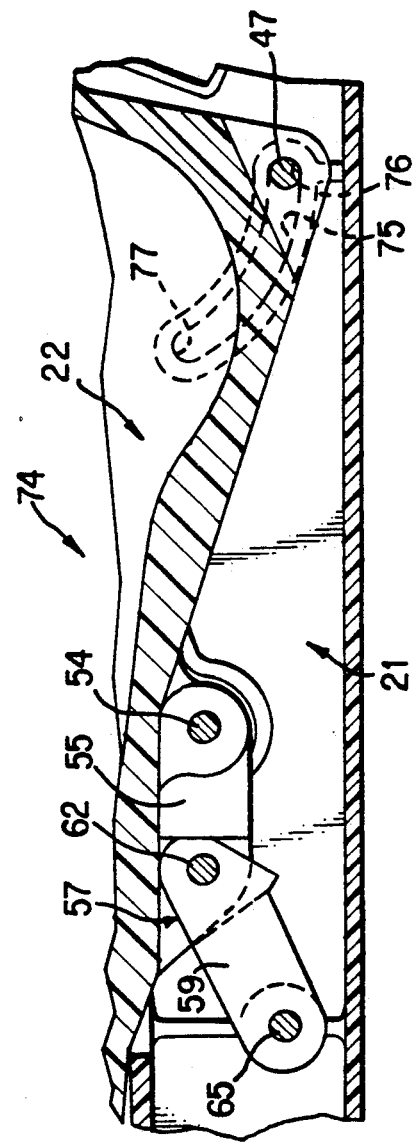

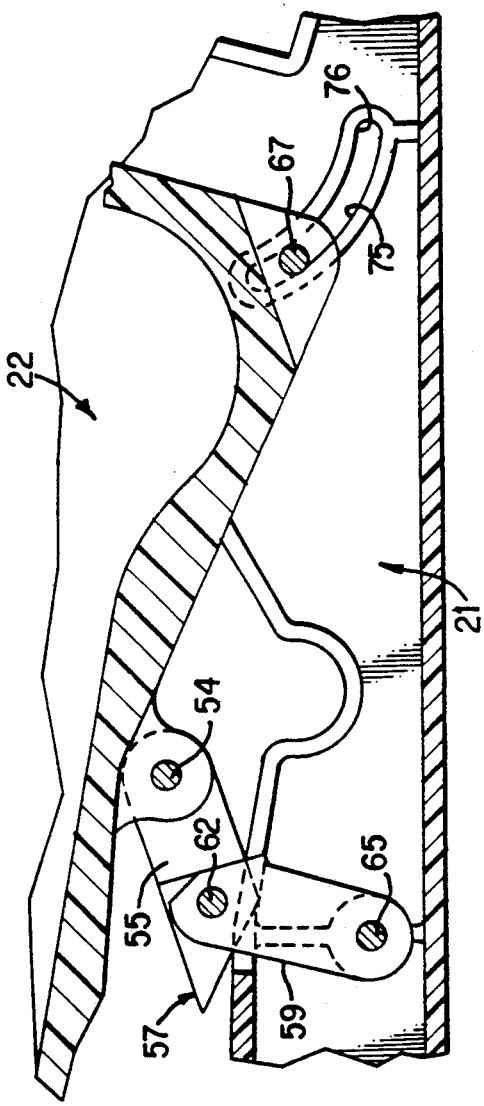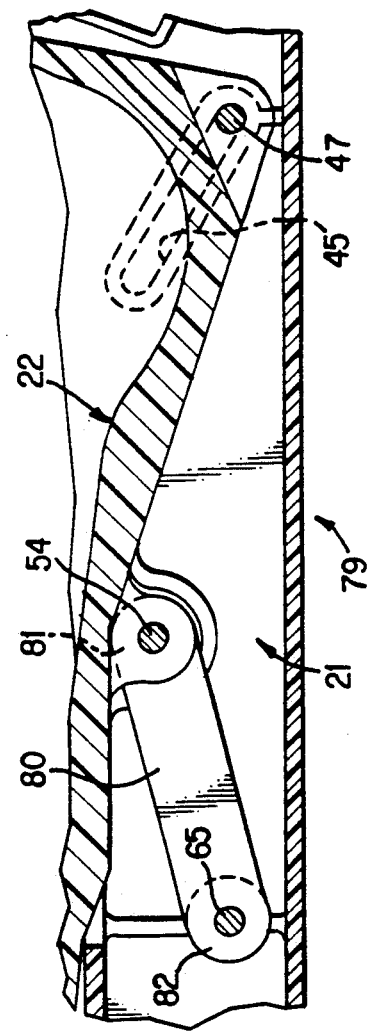
FIG. 9
FIG. 10

PORTABLE SEAT

BACKGROUND OF THE INVENTION

This invention relates to a portable seat particularly for infants and children for use in vehicles. Even more particularly, this invention relates to such a portable seat that has a base attachable to a vehicle seat and has a portable seat connected to the base in such a way that the portable seat, in response to a sudden deceleration of the vehicle, moves through a controlled path that reduces or avoids injury to an infant or child occupying the portable seat.

Reference is made to application U.S. Pat. No. 5,022,707, issued on Jun. 11, 1991 to Beauvais, et al. and assigned to assignee of the present invention wherein some of the linkages and arrangements for the appropriate interconnections of the seat and the base are shown but not in a portable seat.

SUMMARY OF THE INVENTION

The present invention consists of a portable base that has means for releasably attaching it to a rest, such as the seat of a vehicle that is subject to sudden deceleration. The base may be of any configuration and is illustrated as being hollow, having a bottom, sides, a front and a rear, and being essentially open at the top into which the seat is mounted. In all of the embodiments there are connections between the base and the portable seat that produce controlled movement of the seat relative to the base in such manner that the front of the seat moves forward and is elevated upon sudden deceleration of the vehicle and also the back of the seat moves forward and is elevated in the same action. All of the mechanism is self contained within the seat and its base to afford portability.

The seat is particularly useful for children. It can be made with an upright back similar in tilt to the back in a regular car seat or it can be made with a greater tilt and an upwardly extending forward end to support an infant who is too young to sit upright. In all cases, this device, although self contained and portable, can provide for the safety of the child or infant by preventing the child or infant from being thrown forward from the seat upon sudden deceleration of the vehicle.

It is therefore an object of the invention to provide a portable seat, for the safety particularly of children, that comprises a base that can be releasably attached to a vehicle seat and connections between the base and the portable seat which enable the portable seat to move in a way that will counteract the inertia that normally tends to throw the child or the occupant forwardly against, for example, the dashboard or the windshield of the vehicle A further object of the invention is to provide such a portable seat arrangement that is self-contained and can be used in a vehicle or can be taken out and used outside the vehicle.

DESCRIPTION OF THE DRAWINGS

FIG. 5 is an enlarged side view of the lower control portion of the portable seat of FIG. 3 showing the seat and the linkage thereof in the relaxed inactive position;

FIG. 6 is a view similar to FIG. 5 but with the seat and linkage in a partially elevated position responsive to a sudden deceleration;

FIG. 7 is a side view similar to FIG. 5 with the seat and linkage in a further elevated position;

FIG. 8 is a side view similar to FIG. 5 but of a second form of the portable seat in the relaxed position;

FIG. 9 is a side view similar to FIG. 8 but with the seat elevated responsive to a sudden deceleration;

FIG. 10 is a side view similar to FIG. 5 but of a third form of the portable seat in relaxed position;

DESCRIPTION OF PREFERRED EMBODIMENT

Figures 3, 4:
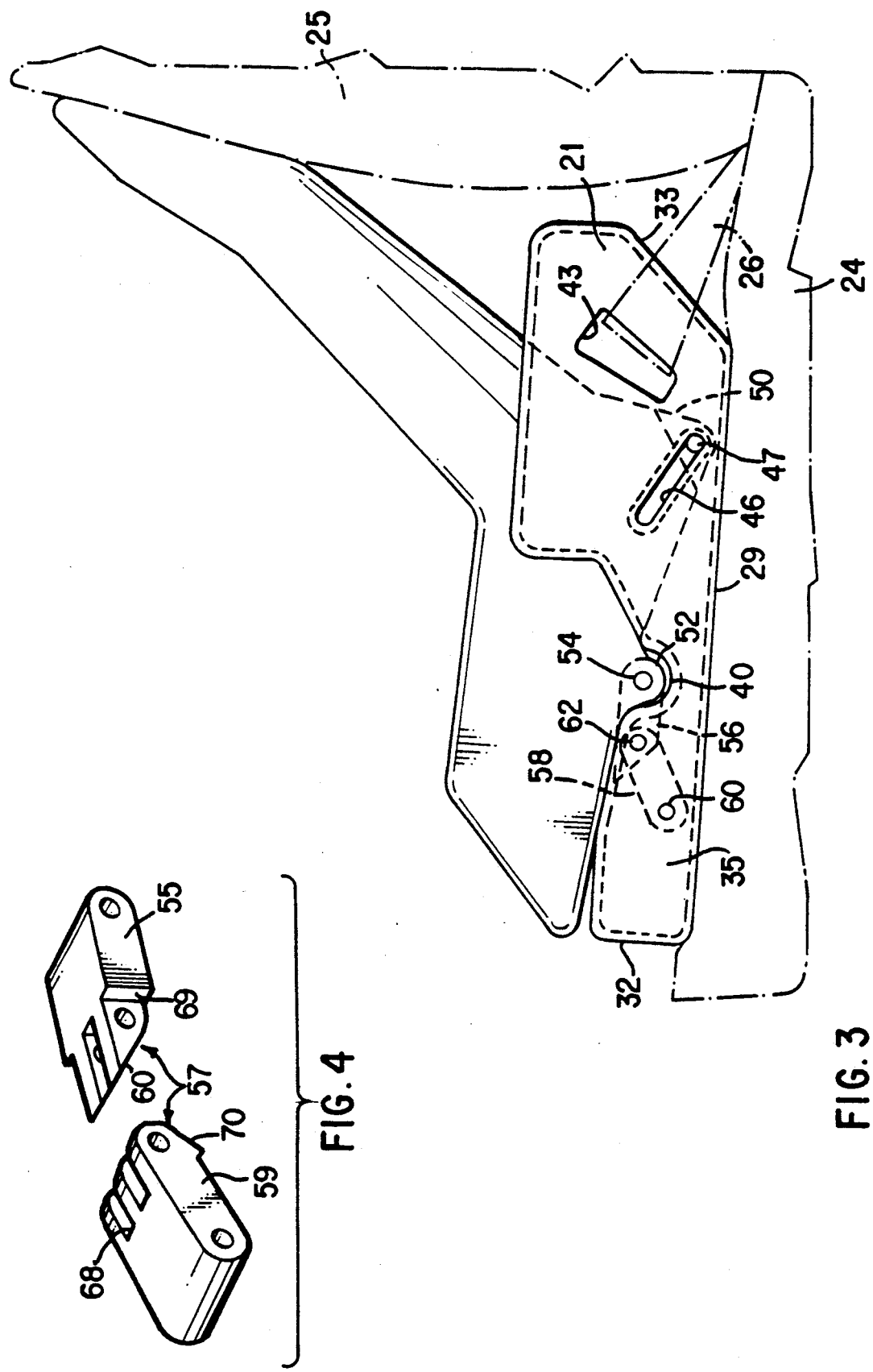
FIG. 3 is a side elevation of the portable seat.
FIG. 4 is a view of a linkage broken apart to show it in detail.

As illustrated particularly in FIG. 3, this portable seat 20 is adapted to be temporarily attached or mounted upon a suitable place such as a vehicle seat. In particular it is useful for children or babies since it can give them a greater security than they can get with other arrangements. It incorporates a base 21 and a seat 22, the seat being mounted upon the base for movement in a manner to be described.

In this illustration, the vehicle seat has a seat portion 24 and a back portion 25, diagrammatically illustrated by dashed lines in FIG. 3. A conventional seat belt 26 attached to the vehicle is shown in dashed lines. In the past, such a conventional seat belt has been used to secure a conventional portable infant or child seat to the vehicle seat. Likewise, the seat belt 26 is used to secure the base 21 of the seat 20 firmly to a vehicle seat.

The base 21 can be of plastic molding or of other material that is sufficiently strong and rigid. Preferably, the seat 22 has the usual seat belts including the belts 27 illustrated for securing the child against sliding in and out of the seat.

The base 21 consists essentially of an open top receptacle having a bottom wall 29, front and back walls 32 and 33, side walls 34 and 35, and generally having its upper edges turned inward a short distance to add strength and rigidity. The seat 22 fits into the open top of this base 21. These seat and base configurations are illustrative and it will be understood that the present invention can be incorporated with a portable seat having a variety of base and seat configurations.

The side walls 34 and 35 are provided with opposite recesses 39 and 40 for a purpose to appear. The side walls likewise have seat belt receptacles or openings 42 and 43 to receive the seat belt 26 to secure the base 21 to the vehicle.

The seat 22 is secured to the base 21 for controlled relative movement. To this end, there are slots 45 and 46 in the two sides 34 and 35 of the base 21 that receive a spindle rod 47 and that extend generally upwardly from their initial position, at an angle of approximately 30°. The rod 47 is supported in brackets 49 and 50 extending on opposite sides from the lower rearward portion of the seat 22. By this arrangement, should the seat 22 move forward, it will also move upwardly in its rear portion.

The front part of the seat 22 is also supported for movement. To this end, the seat has depending brackets 51 and 52 to receive a pivot rod 54 that passes through the back elements 55 and 56 of two compound links 57 and 58. The recesses 39 and 40 prevent interference between these brackets 51 and 52 and the sides 34 and 35, respectively, of the base 21. The front elements of these two compound links 57 and 58 are indicated at 59 and 60. The ends 55 and 59 of the compound link 57 and the two ends 56 and 60 of the compound link 58 are respectively pivotally connected together by a rod 62. The front ends of the elements 59 and 60 are likewise mounted upon a rod 65, the ends of which are fixed, such as into suitable bosses 66 formed integrally with the base 20. (The rods 54, 62 and 65 serve as pivots for both compound links 57 and 58, but individual pins for each compound link 57 and 58 would be satisfactory.)

The compound links 57 and 58 are designed to have limited pivotal movement. Thus if the seat moves from the position of FIG. 5 to that of FIG. 6, the two back link elements 55 and 56 will not pivot about the rod 54, but the forward link elements 58 and 59 will pivot about both of their two rods 62 and 65 through a limited arc. Thereafter the two compound links 57 and 58 will pivot as units about the rods 54 and 65 from the position of FIG. 6 to that of FIG. 7.

To accomplish the foregoing, reference will be made to the link 57 as it appears in FIGS. 4-7, the other link 58 being the same. The rear link element 55 has a sloping face 67 that engages a face 68 on the front link element 59 so as to limit the relative movement of the two link elements in the direction of straightening themselves out and prevent them from inverting and moving the rod 62 below the plane of the two rods 54 and 65.

Additionally, the rear element 55 has a flat face 69 whereas the front element 59 has an arcuate end terminating in a straight wall 70 that can be engaged with the face 69 of the rear member 55. When the face 69 and wall 70 are engaged, as shown in FIG. 6, further pivoting between the two link elements 55 and 59 about the rod 62 is thereafter blocked so that the two elements 55 and 59 move as one unitary link, such as from the position of FIG. 6 to the position of FIG. 7.

Thus upon a sudden deceleration or collision of the vehicle, the base 21 remains fixed to the vehicle seat 24 whereas the portable seat 22 tends to move forward because of inertia. In so doing, as the rear of the seat is moved forward, it is lifted by movement of the rod 47 within the slots 45 and 46. As the front of the seat moves forward, it is lifted to a greater extent than the rear. In the first stage of movement in this embodiment, the front is raised solely by the action of the link elements 59 and 60 pivoting about the rods 65 and 62, since the other link elements 55 are held against the bottom of the seat 21.

When the movement of the seat has reached the position of FIG. 6, the faces 69 engage the walls 70 causing the compound links 57 and 58 to operate as unitary links equivalent to the distance between the rods 54 and 65. Thus the front of the seat is raised more rapidly for this second stage of the movement than for the first stage.

FIGS. 8 and 9 show a second embodiment of the invention 74. All the parts are the same except for the fact that instead of straight slots 45 as in FIGS. 5-7, arcuate slots 75 are incorporated. Therefore, parts of FIGS. 8 and 9 corresponding to those of FIGS. 5, 6 and 7 are identified by the same numbers. The arcuate slots 75 extend from a lower rear end 76 to an upper front end 77.

The center of curvature in the example is illustrated as being above the lowermost part of the slot 75 and about the same distance above that point as it is from the upper end of the slot 75.

The advantage of this arrangement is that the initial movement of the back of the seat is not essentially one of elevation because the tangent at the initial (rear) end 76 of the slot 75 is at or nearly horizontal. This allows the rod 47 to initiate movement in substantially a forward direction and to gain momentum before it is forced upwardly. As the rod 47 moves further forward, the curvature of the slot 75 begins to elevate the rod 47 at a progressively steeper rate.

Figure 11:
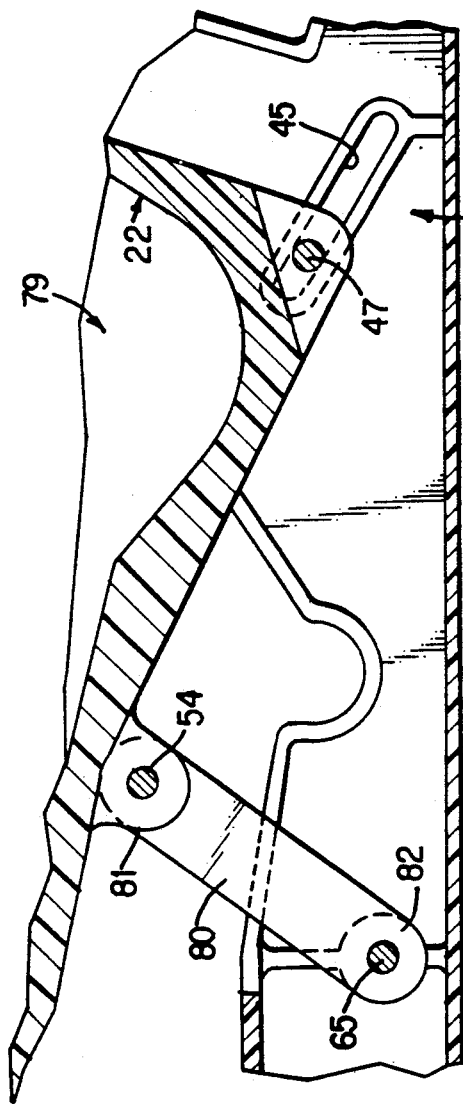
FIG. 11 is a side view similar to FIG. 10 but with the seat in an elevated position responsive to a sudden deceleration.

FIGS. 10 and 11 show a third embodiment 79 similar to that of FIGS. 5-7 save that the compound links 57 and 58 are replaced by forward links 80 of constant length. Thus it will not have the arrangement for initial lift of the forward part of the seat at a low rate followed by an increasing rate of lift as in the compound links 57 and 48. In the embodiment 79, the rearward end 81 of a link 80 pivots on the rod 54, and the forward end pivots on the rod 65. The back of the seat in this arrangement is shown as having the slot 45 as in FIGS. 5-7, but it will be understood that a curved slot 75 as shown in FIGS. 8 and 9 could be incorporated with the links 80 of FIGS. 9 and 10.

Figure 12:
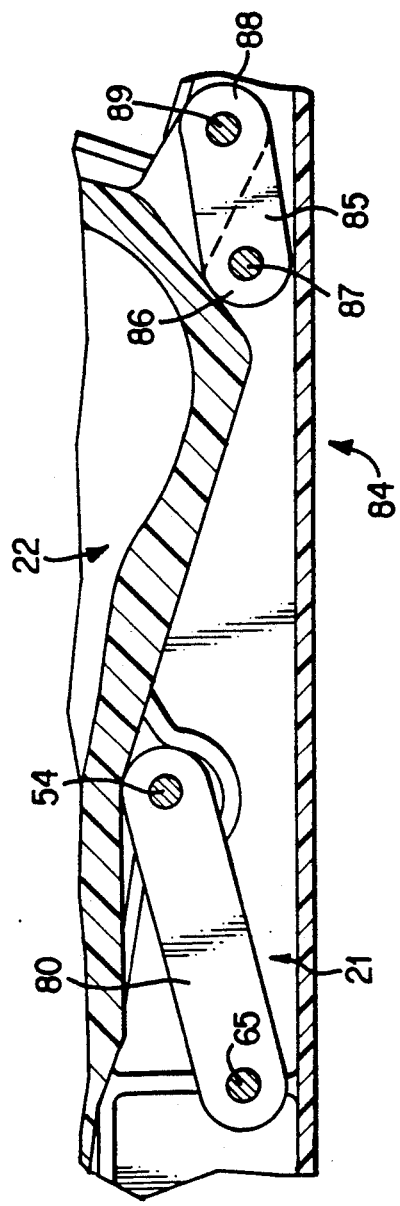
FIG. 12 is a side view similar to FIG. 5 but of a fourth form of the portable seat shown in its relaxed inactive position.
Figure 13:
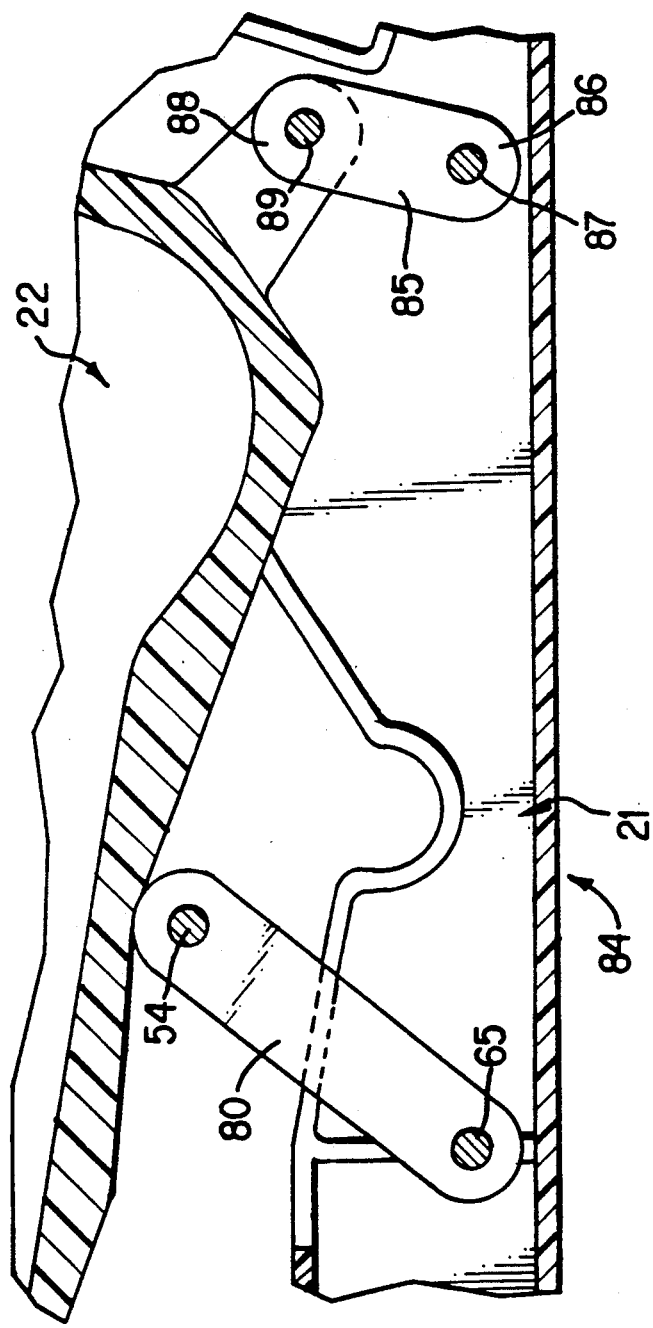
FIG. 13 is a view similar to FIG. 12 but with the seat in an elevated position responsive to a sudden deceleration.

A fourth embodiment 84 of FIGS. 12 and 13 is similar to the embodiment 79 of FIGS. 10 and 11 except that in place of the slot 45 and rod 47 at the rear, on each side of the portable seat, there is a fixed sized link 85 at the rear. The front end 86 of the link is pivoted on a rod 87 suitably supported by the base 21. The rear end 88 of the link 85 is pivotally mounted on a rod 89 suitably supported by the seat 22.

In the starting position, the links may be as shown in FIG. 12. As the vehicle is moving to the left in the drawings and is suddenly stopped, forward inertia of the seat 22 will cause the links 80 and 85 to pivot to positions such as illustrated in FIG. 13. This will elevate the front and rear of the seat 22 as the front and rear move forward. Because the link 80 is longer than the link 85, the front of the seat 22 will be elevated at a faster rate than the rear.

Figure 1:
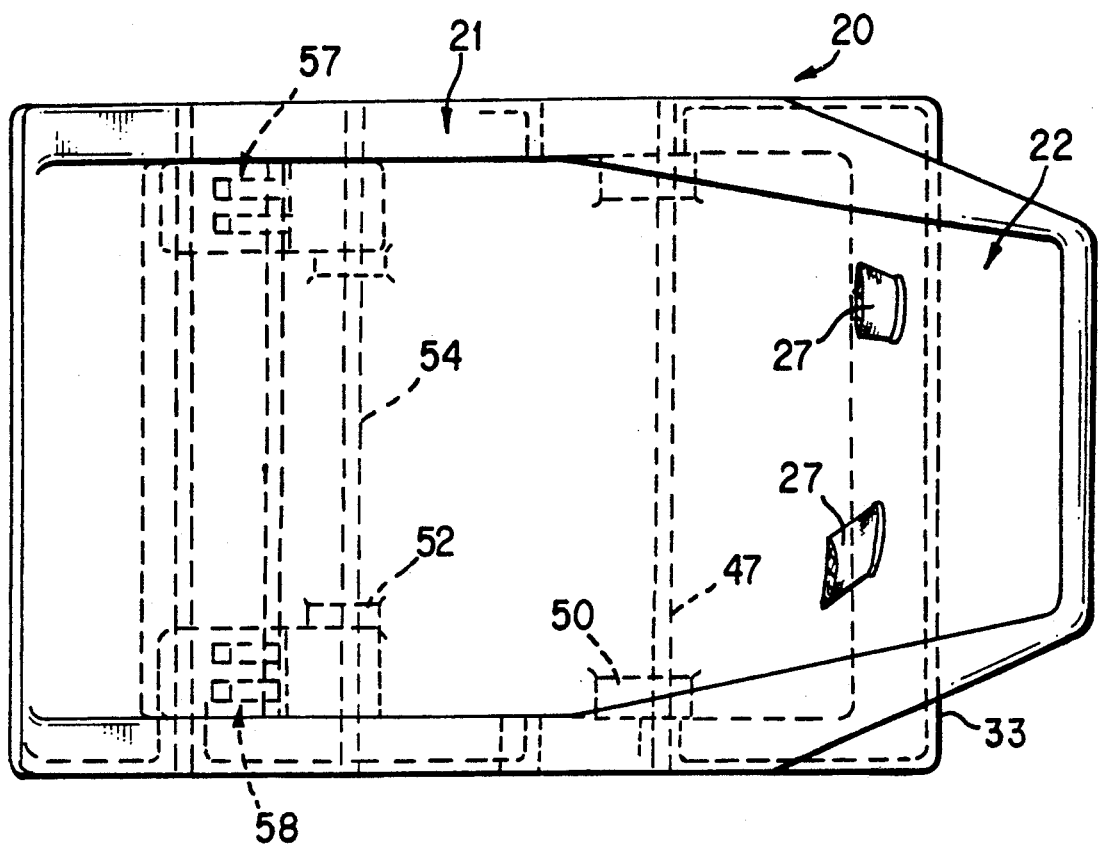
FIG. 1 is a plan view of a first form of the portable seat.
Figure 2:
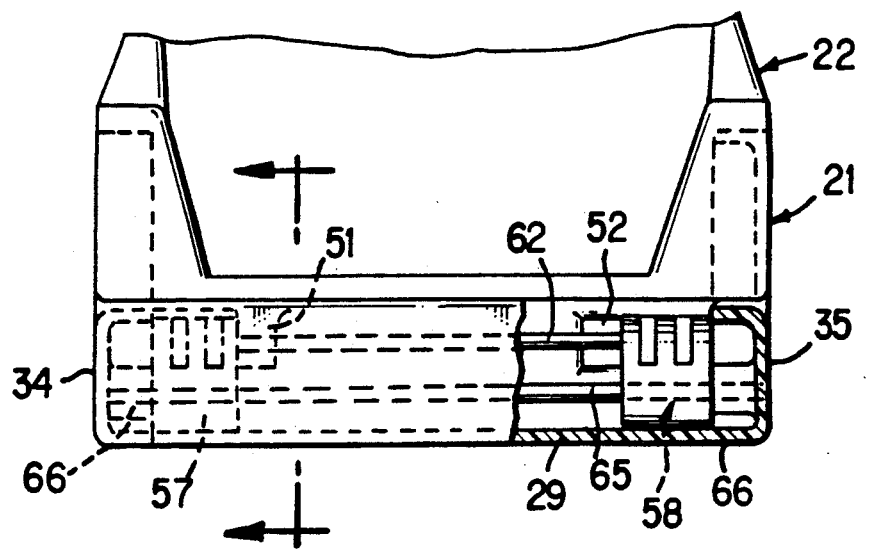
FIG. 2 is a front elevation view thereof partly broken away taken from the left end of FIG. 1.
Figure 14:
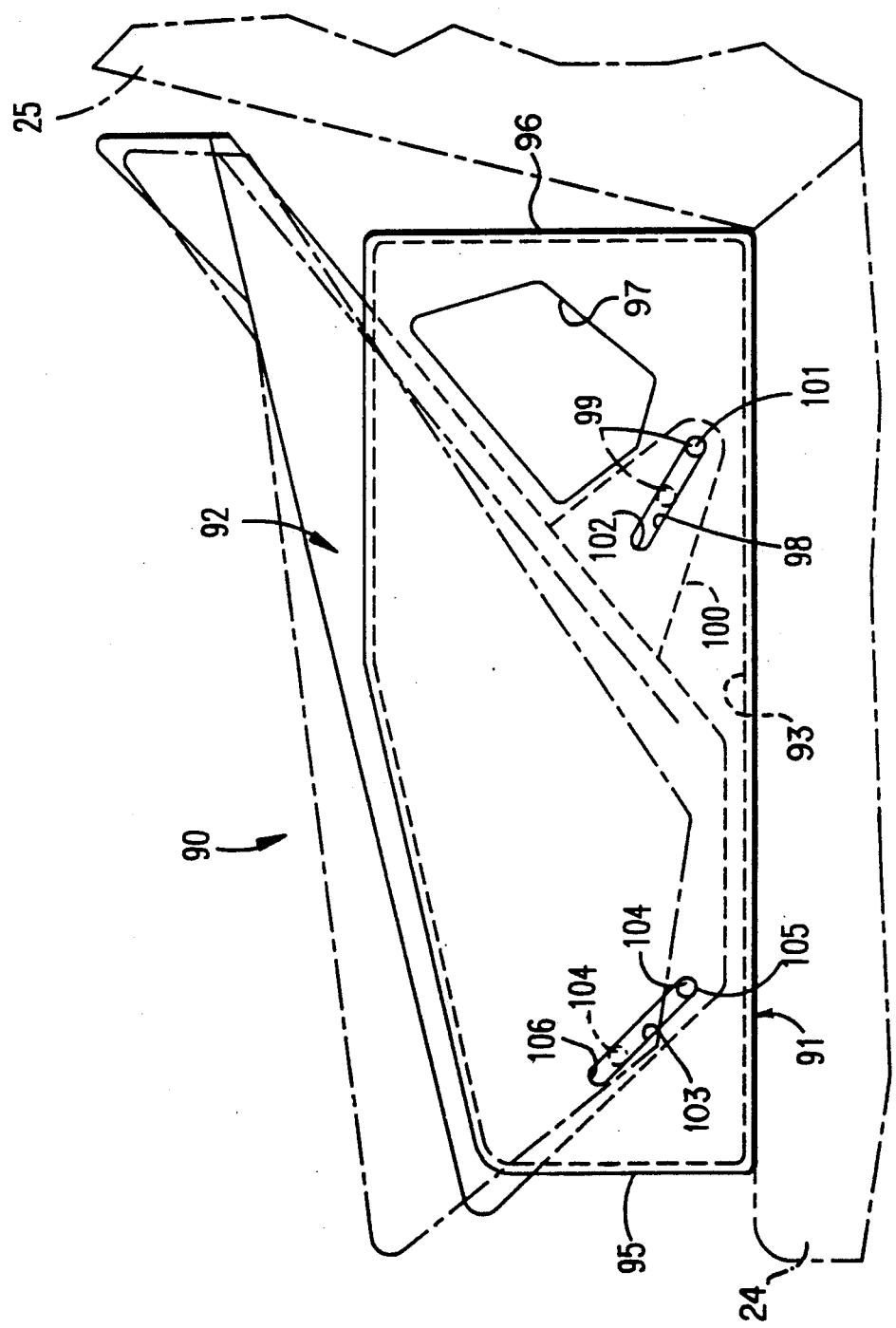
FIG. 14 is a side view of a fifth embodiment of the portable seat illustrating an infant seat that embodies these general principles but is appropriately tilted in the starting position for holding an infant or baby.

In FIG. 14, there is shown a modification not merely of the tilting mechanism, but also of the seat itself. This portable seat 90 has a base 91 and a seat 92. However, whereas the seat 20 of FIG. 1 is more upright as is appropriate for a somewhat older child capable of sitting upright, the seat 92 is more inclined than is customary for supporting a baby or infant. In FIG. 14, the seat 92 appears in its initial at rest position in full lines, and in dashed lines as it is moved upwardly responsive to a sudden deceleration.

The base 91, as before, may be of any appropriate form and is shown is an open-topped receptacle with a bottom wall 93, two side walls 94, and front and rear walls 95 and 96. The side walls 94 have openings 97 to receive a seat belt so the base 91 can be secured to a vehicle seat 24 as is conventional. The seat 90 should face the front of the vehicle. The base 92 also has slots 98 in its side walls 94 at the rear in which a pin or rod 99 can slide. This rod 99 is mounted in brackets 100 that extend backwardly and downwardly from the seat 92, and the rod 99 extends across into the slots 98 on each side 94 of the base 91. The slot 98 is preferably at an angle of about 20°-30° extending forwardly and upwardly from its rear end 101 to its forward end 102.

At the forward end, each side wall 94 of the base 91 has a slot 103 that receives a rod 104 supported on the seat 92. Each slot 103 extends forwardly and upwardly from a lower rearward end 105 to a forward upper end 106, preferably at an angle that is about 5°-15° greater than the angle of the slot 98. For example, if the slots 98 are at an angle of about 25° to horizontal, the slots 103 are at angles of about 30°-45°. It is preferable that the forward end of the seat 92 rise further than the rear, but both ends should move upwardly as well as forwardly.

It should be understood that forward and rearward slots like the slots 98 and 103 can be incorporated on the more upright seat 20. Further, any of the front and rear mechanisms for controlling upward and forward movement of the seat 22 could be incorporated in the embodiment 90 for controlling upward and forward movement of the seat 92. Still further, on either of any of the forward control means, the compound linkages 57 or 58, the link 80, or the slot 103, can be incorporated with any of the rear control means (the slot 45, 46, or 98, the slot 75, or the link 85).

Operation

In all of these embodiments there is a portable base into which is fitted a seat for movement forwardly and upwardly in response to a sudden abrupt deceleration of the base. Although the seat and base are self-contained, they can be used in connection with any vehicle or movable object that can be subjected to sudden deceleration. Also they can be removed from the vehicle and used elsewhere and returned repeatedly for use in the vehicle. The bases are designed to be supportive of the seats whether the bases are mounted on a vehicle seat or on a stationary support.

When the seats are mounted in a vehicle of one kind or another such as an automobile or an airplane, they should be fastened to the seat of the vehicle as by the seat belt 26 that is passed through the openings 43 or 97.

There are also other seat belts such as 27. There may be several of them in the back of the seat and there should be one of these that extends between the legs of an infant or child to keep the infant or child from sliding out from under the other seat belts and out of the seat itself.

In the arrangement of FIGS. 1-7, typically the slots 45 and 46 may be about 2½ inches long and can be at approximately 30° to the horizontal of the base.

The distance from the rod 54 to the rod 62 may be slightly less than two inches, and the distance from the rod 62 to the rod 65 is approximately two inches. The distance between the rods 54 and 65 in the positions of FIG. 5 is approximately four inches. When collapsed, as in FIG. 7, that distance is approximately 3½ inches. The distance between the rods 47 and 54 can be approximately seven inches. Similar dimensions could apply to all of the examples.

As noted, the base 21 should be made of some material that is strong enough to stand the uses to which it is put the operation. A molded plastic can suffice, particularly if its walls are turned in as illustrated, or are doubled.

Referring first to FIGS. 1-7, in the event of a sudden deceleration of the vehicle upon which the vehicle seat 24 is fixed, inertia will cause the seat 24 as well as the base 21, the seat 22 and the occupant to attempt to move forward until the energy is spent. Looking at FIG. 3, this inertia may cause the occupant to move forward ahead of or together with the back of the seat depending upon their comparative weights and the momentum with which the seat and the occupant are applied.

Tests have shown that the energy of impact may be dissipated or quickly spent if the back part of the seat moves up as well as the front part, although normally not as much. Consequently, upon a collision, with the arrangement of FIG. 3, the principal seat belt 26 may be stretched a little, and the vehicle seat 24 may travel forward. But the seat 22, moving forward relative to the base 21, will be lifted both in the front and the rear.

With the compound front link the initial forward movement produces little front elevation of the seat as shown by comparing FIGS. 5 and 6, while the rear of the seat is raised, although less than the front. After the condition of FIG. 6, the seat can continue to move forward to the position of FIG. 7, with the front of the seat being elevated to a greater degree than the rear of the seat.

It can be seen that the mechanism for producing the elevation of both the rear and the forward part of the seat 22 with respect to the base 21 is entirely self contained within the apparatus here shown. This means that the base is sufficiently strong to contain the mechanism including the links and the slides and the rods.

Normally, the seat will not have to move forward all the way. Moving about as far as shown in FIG. 7 is usually enough to spend the kinetic energy. Then the weight of the occupant will return the seat to its position of FIG. 5 because of gravity.

In the device of FIGS. 8 and 9, the action of the forward part of the seat is the same as that of FIGS. 5-7 The rear slot 75, however, is in this case arcuate and concave upwardly so that the initial forward movement of the seat will not produce a great deal of movement upwardly of the rear of the seat because the initial part of the track or slot 75 is almost horizontal. It has been found that under certain circumstances, this is preferable to the straight slot shown in FIGS. 5-7.

The arrangement of FIGS. 10 and 11 has a straight slot 45 and the rod 47, but in place of the compound linkage, it has a single link 80 between the rod 54 and the rod 65. This means that the front part of the seat will lift more rapidly as soon as the seat moves forward at all and can lift further than the seat does in going from the position of FIG. 10 to that of FIG. 11 in contrast to what happens in the other example going from the position of FIG. 5 to that of FIG. 7. This arrangement has the virtue of relative simplicity.

The example of FIGS. 12 and 13 has links at both front and rear. The rear link in this case will normally move from the position of FIG. 12 to nearly a vertical position of FIG. 13 thereby lifting the rear of the seat while the front is moved up by the link 80. This arrangement has the virtue of simplicity.

FIG. 14 shows use of a forward and rear slot arrangement, the forward slot having a greater slope than the rear slot. In this case upon a collision or other sudden deceleration, the rear of the seat is moved upwardly as soon as the forward movement occurs. Certain tests have shown that in case of an abrupt deceleration of the vehicle, the occupant may move forward a little bit ahead of the seat itself and then the seat catches up with him. With the slot arrangement as shown here, that situation is minimized.

The use of this arrangement with the infant seat, which can be used before the child is sitting up on its own, is particularly useful. However, it also can be applied to any of the other arrangements.

It will be seen that in all of these cases, the base comprises a receptacle for receiving the seat and also for receiving the operating mechanism comprising the links or the slots or the links and slots. This is to be contrasted with arrangements such as those shown in U.S. Pat. No. 2,575,953 and U.S. Pat. No. 4,687,255 and its companion U.S. Pat. No. 4,653,809, since in those cases, the seat itself does not move. In the latter two cases, there is a baffle that is placed in front of the person occupying the seat.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A portable seat that can be installed on a seat of a vehicle that is subject to sudden deceleration, the portable seat comprising a base section having means for releasably mounting the base section onto a vehicle seat, a seat section, and means connected between the seat section and the base section for providing relative movement between the seat section and the base section, to absorb energy of inertia upon sudden deceleration of the vehicle, wherein the means for providing movement between the seat section and the base section includes means for raising both forward and rearward parts of the seat section as the seat section is moved forward by inertia relative to the base section.

2. The arrangement of claim 1 wherein the raising means includes means for raising the forward part of the seat section further than the rearward part.

3. In the arrangement of claim 1, said raising means including a slot and a pin arrangement, one of which is part of the seat section and the other of which is part of the base section.

4. In the arrangement of claim 1, said raising means including a front pin and slot arrangement and a rear and pin slot arrangement, the front pin and slot arrangement having a slope different from that of the rear pin and slot arrangement so the front part of the seat section is raised more abruptly than is the rear part of the seat section.

5. In the arrangement of claim 4, wherein the length of at least one of the slots is at least about 2½".

6. In the arrangement of claim 4, wherein at least one of the slots is arcuate about a center above said at least one slot.

7. In the arrangement of claim 4, wherein the slots are arcuate about centers above the slots.

8. In the arrangement of claim 1, the base section having spaced opposed side walls, two slots in each side wall, one in each side wall for the forward part of the seat section, one in each side wall for the rearward part of the seat section, and two pins both attached to the seat section, one at the forward part of the seat section, one at the rearward part of the seat section, to slide within the two slots on the base section, the rear slot having a slope with respect to the horizontal that is less than the slope of the front slot.

9. In the arrangement of claim 1, the base section comprising a pair of opposite side members to be disposed on opposite sides of the seat section, means connecting the two together, and the side members being sufficiently strong to support the seat section and to provide for its movement as aforesaid.

10. In the arrangement of claim 1 with the means for providing relative movement including link means for elevating the seat section, the link means being divided into two elements pivoted together, there also being a pin arrangement securing one end of the links to the seat section and a pin arrangement for securing the other end of the links to the base section, means in the links to cause the elements of the links to have limited relative pivoting movement during the initial forward movement of the seat section relative to the base section with means to limit such relative pivoting upon a predetermined amount of forward movement and to cause the elements of the link to move as a unit upon further movement of the seat section relative to the base section.

11. In the arrangement of claim 1, there being means to raise the forward part of the seat section and means to raise the rearward part of the seat section, one of the said means comprising a pin and a slot arrangement wherein the slot is concavely curved upwardly so that upon forward movement of the seat section on the base section, the initial movement of the rearward part of the seat section will be minimally vertical followed by progressively more abrupt vertical movement.

12. In the arrangement of claim 1, wherein the means to raise the forward part of the seat section comprises a double-element link that during the initial forward movement of the seat section relative to the base section affords relatively small amounts of elevation of the front of the seat section for a predetermined distance and then increases the rate of raising of the front of the seat section during further forward movement of the seat section relative to the base section.

13. A portable safety seat that can be installed in a vehicle subject to sudden deceleration comprising a portable base and a seat with means usable to hold the base onto a vehicle seat, the base having a bottom and two spaced sides projecting upwardly from the bottom, and means for securing the seat to the base, the securing means including means to provide controlled movement of the seat relative to the base in response to sudden deceleration of the vehicle, the last named means comprising a first rod means supported at a back portion of the seat, slots in the two spaced sides in which the first rod means engages and in which they can move, the slots extending from a lower rearward position to an upper forward position of the spaced sides, the engagement of the first rod means in the slots enabling simultaneous forward and upward movement of the seat in its entirety relative to the base, a second rod means supported by a front portion of the seat, and means interconnecting said second rod means with the base to cause the front portion of the seat to rise upon forward movement of the seat with respect to the base.

14. In the combination of claim 13, the interconnecting means comprising a front slot in each side of the base into which the second rod means extend, each front slot extending forwardly and upwardly so as to provide a greater lifting at the front portion of the seat than at the rear portion.

15. In the combination of claim 13, the interconnecting means comprising links at the spaced sides of the base connected to the second rod means and also connected to the base and having a length to raise the front portion of the sat to a greater extent than the rear portion of the seat is raised upon forward movement of the seat as by inertia.

16. A seat adapted to be located in an automobile or other vehicle on the top of the seat of the vehicle, comprising: a base having an open top and a seat mounted on the base within the open top, the seat being of a size to accommodate an infant, means to attach the base to the seat of the vehicle removably, and to hold the same against substantial forward movement upon sudden deceleration of the vehicle, the seat having a back sloping upwardly and backwardly and having a forward section extending upwardly and forwardly to receive an infant in a reclining position and to minimize the possibility of the infant's slipping forwardly out of the seat, the seat having projections extending downwardly from opposite sides of the back thereof and having a rear rod means connected thereto, a slot in each side of the rearward portion of the base extending upwardly and forwardly, the rear rod means extending into the slots so that the back of the seat is raised upon forward movement thereof, front rod means supported at the forward end of the seat, a slot in each side of the forward portion of the base, said forward slots extending forwardly and upwardly, the front rod means extending into the slots to raise the forward end of the seat when the back end of the seat is raised, the forward slots extending upwardly and forwardly at a steeper angle than do the rear slots so as to raise the forward part of the seat more than the backward end is raised upon deceleration.

17. The slot means of claim 13 wherein the length of the slot is at least about 2¼".

18. A portable safety seat that can be installed in a vehicle subject to sudden deceleration comprising a portable base and a seat with means usable to hold the base onto a vehicle seat, the base having a bottom and two spaced sides projecting upwardly from the bottom, and means for securing the seat to the base, the securing means including means to provide controlled movement of the seat relative to the base in response to sudden deceleration of the vehicle, the last named means comprising a rod means supported by the seat, slots in the two spaced sides in which the rod means engage and in which they can move, the slots extending from a lower rearward position to an upper forward position of the spaced sides, the engagement of the rod means in the slots enabling simultaneous forward and upward movement of the seat in its entirety relative to the base wherein at least one of the slots is arcuate about a center above said at least one slot.

19. The portable safety seat of claim 18 wherein the slots are arcuate about centers above the slots.

* * * * *